United States Patent
Nakajima et al.

(10) Patent No.: US 11,297,491 B2
(45) Date of Patent: Apr. 5, 2022

(54) INFORMATION SHARING SYSTEM AND INFORMATION SHARING METHOD

(71) Applicant: HONDA MOTOR CO., LTD., Tokyo (JP)

(72) Inventors: Kei Nakajima, Tokyo (JP); Kichinosuke Fukuhara, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 612 days.

(21) Appl. No.: 16/292,966

(22) Filed: Mar. 5, 2019

(65) Prior Publication Data

US 2019/0281452 A1 Sep. 12, 2019

(30) Foreign Application Priority Data

Mar. 7, 2018 (JP) .............................. JP2018-040532

(51) Int. Cl.
*H04W 12/02* (2009.01)
*H04L 67/50* (2022.01)
*H04W 8/20* (2009.01)
*H04W 12/033* (2021.01)

(52) U.S. Cl.
CPC ............ *H04W 12/02* (2013.01); *H04L 67/22* (2013.01); *H04W 8/20* (2013.01); *H04W 12/033* (2021.01)

(58) Field of Classification Search
CPC ..... H04W 12/02; H04W 12/033; H04W 8/20; H04L 67/22
See application file for complete search history.

(56) References Cited

U.S. PATENT DOCUMENTS

| | | | | |
|---|---|---|---|---|
| 2014/0173700 | A1* | 6/2014 | Awan | H04L 63/10 726/4 |
| 2015/0040020 | A1* | 2/2015 | Yoon | H04L 67/22 715/738 |
| 2015/0188971 | A1* | 7/2015 | Yoon | H04L 67/20 709/219 |
| 2018/0213046 | A1* | 7/2018 | Cherdabayev | G06Q 50/01 |

FOREIGN PATENT DOCUMENTS

JP 2014-228986 A 12/2014

* cited by examiner

*Primary Examiner* — Arvin Eskandarnia
(74) *Attorney, Agent, or Firm* — Carrier Blackman & Associates, P.C.; Joseph P. Carrier; William D. Blackman

(57) ABSTRACT

Appropriately sharing user information. An information sharing system includes: a specific information acquisition unit that acquires specific information of each terminal from a plurality of user terminals which are carried by users; a user information acquisition unit that acquires user information from the plurality of user terminals; an information management unit that encrypts the user information that is acquired by the user information acquisition unit on the basis of the specific information that is acquired by the specific information acquisition unit; a state acquisition unit that acquires the specific information of a user terminal that accesses a network including a sharing device from the sharing device that is a terminal other than the user terminals; and a sharing unit that shares the user information by decoding the user information that is encrypted by the information management unit with the specific information that is acquired by the state acquisition unit.

8 Claims, 8 Drawing Sheets

FIG. 5

USER INFORMATION DATABASE

| TERMINAL-SPECIFIC INFORMATION | ASSOCIATED TERMINAL-SPECIFIC INFORMATION | USER INFORMATION |
|---|---|---|
| $a^{th}$ USER TERMINAL | $b^{th}$ USER TERMINAL | ... |
| $b^{th}$ USER TERMINAL | $a^{th}$ USER TERMINAL | ... |
| ⋮ | ⋮ | ⋮ |
| $n^{th}$ USER TERMINAL | $X^{th}$ TERMINAL, $Y^{th}$ TERMINAL | ... |

INFORMATION SHARING SYSTEM AND INFORMATION SHARING METHOD

This application is based on and claims the benefit of priority from Japanese Patent Application No. 2018-040532, filed on 7 Mar. 2018, the content of which is incorporated herein by reference.

BACKGROUND OF THE INVENTION

Field of the Invention

The present invention relates to an information sharing system and an information sharing method for sharing information.

Related Art

In recent, a smartphone and a pc have being spreading, and individuals typically carry and use the information devices. In the information devices, a user uses various pieces of information by browsing the Internet or operating various kinds of application software in accordance with a taste or preference.

In this manner, it is possible to provide more services to users by sharing information and the like (hereinafter, appropriately referred to as "user information") related to use of the information devices by users between the users.

An example of a technology related to the user information between users is disclosed in Patent Document 1. In the technology disclosed in Patent Document 1, application information including a use history of an application that is used is uploaded to a control server. In addition, other terminals download and use the application information that is uploaded to share the application information. In this manner, when sharing the application information between users, it is possible to allow users to find a desired application or it is possible to provide a new favorite.

Patent Document 1: Japanese Unexamined Patent Application, Publication No. 2014-228986

SUMMARY OF THE INVENTION

When using the technology disclosed in Patent Document 1 and the like, it is possible to realize sharing of the user information. However, when the user information is shared in any case without limitation, there is a problem that a history related to use of an information device of an individual, and the like are known to a third party at a non-intended site, or private information included in the user information may be leaked.

The invention has been made in consideration of such circumstances, and an object thereof is to provide an information sharing system and an information sharing method which are capable of appropriately sharing user information.

(1) According to aspect of the invention, there is provided an information sharing system (for example, an information sharing system S to be described later) including: a specific information acquisition unit (for example, a specific information acquisition unit 112 to be described later) that acquires specific information of each terminal from a plurality of user terminals (for example, user terminals 10 to be described later) which are carried by users; a user information acquisition unit (for example, a user information acquisition unit 113 to be described later) that acquires user information from the plurality of user terminals; an information management unit (for example, an information management unit 114 to be described later) that encrypts the user information that is acquired by the user information acquisition unit on the basis of the specific information that is acquired by the specific information acquisition unit; a state acquisition unit (for example, a state acquisition unit 212 to be described later) that acquires the specific information of a user terminal that accesses a network including a sharing device from the sharing device that is a terminal other than the user terminals; and a sharing unit (for example, a sharing unit 213 to be described later) that shares the user information by decoding the user information that is encrypted by the information management unit with the specific information that is acquired by the state acquisition unit.

According to (1), in a case where specific information of a user terminal can be acquired, the user information can be shared with the sharing device. Accordingly, it is possible to prevent the user information from being shared at a site that is not intended by a user of the user terminal. That is, according to the information sharing system of the invention, it is possible to appropriately share the user information.

(2) In the information sharing system according to (1), the specific information acquisition unit may further acquire the specific information of other user terminals related to a host user terminal from the user terminals, the information management unit may associate user terminals which are correlated with each other on the basis of the specific information of the other user terminals which are correlated with the host user terminal, and the sharing unit may share the user information of the user terminal that accesses the network including the sharing device, and the user information of the user terminals which are associated with the user terminal that accesses the network including the sharing device.

According to (2), correlating user terminals are associated with each other, and thus it is possible to share the user information of the user terminals which are associated with each other. Accordingly, in a case where a plurality of user terminals are used, it is possible to share all pieces of the user information of the user terminals.

(3) In the information sharing system according to (2), in a case where a plurality of the user terminals which access the network including the sharing device exist, if the user terminals which are associated with the plurality of user terminals overlap each other, the sharing unit may preferentially share user information of the overlapping user terminal.

According to (3), it is possible to share user information of a user terminal which is commonly used by a plurality of user terminals (that is, a plurality of users who use the user terminals). For example, it is possible to share user information of a user terminal such as a pc that is shared by a family in a house.

(4) In the information sharing system according to any one of (1) to (3), in a case where a plurality of the user terminals which access the network including the sharing device exist, if users of the plurality of user terminals are not determined as a family, the sharing unit does not share the user information.

According to (4), in a case where a user who uses a user terminal other than the family seems to exist in the vicinity of the sharing device, it is possible to prevent the user information of the family from being shared.

(5) In the information sharing system according to any one of (1) to (4), in a case where the number of the user terminal that accesses the network including the sharing device is one piece, the sharing unit may share the user information.

According to (5), the user information can be shared only in a case where only one user exists in the vicinity of the sharing device. That is, it is possible to prevent the user information from being shared in a case where a user who uses another user terminal seems to exist in the vicinity of the sharing device.

(6) In the information sharing system according to any one of (1) to (5), the sharing unit may acquire recommended information for the user on the basis of the user information that is shared, and may also share the acquired recommended information in addition to the user information.

According to (6), it is possible to share recommended information that is estimated to match preference of a user on the basis of the user information. For example, it is possible to share recommended information that is searched on the Internet, and the like on the basis of the user information.

(7) In the information sharing system according to any one of (1) to (6), the state acquisition unit may detect that all of the user terminals which access the network including the sharing device terminate access to the network including the sharing device, and the sharing unit may perform processing of deleting the user information that is encrypted by the information management unit in response to a situation, in which the state acquisition unit detects that all of the user terminals which access the network including the sharing device terminate access to the network including the sharing device, as a trigger.

According to (7), the user information can be deleted after termination of sharing, and thus it is possible to more safely protect the user information. For example, it is possible to prevent the user information from being stored in the sharing device that is used by a plurality of unspecified users.

(8) According to another aspect of the invention, there is provided an information sharing method that is performed by an information sharing system (for example, an information sharing system S to be described later). The method includes: a specific information acquisition step of acquiring specific information of each terminal from a plurality of user terminals (for example, user terminals 10 to be described later) which are carried by users; a user information acquisition step of acquiring user information from the plurality of user terminals; an information management step of encrypting the user information that is acquired in the user information acquisition step on the basis of the specific information that is acquired in the specific information acquisition step; a state acquisition step of acquiring the specific information of a user terminal that accesses a network including a sharing device from the sharing device that is a terminal other than the user terminals; and a sharing step of sharing the user information by decoding the user information that is encrypted in the information management step with the specific information that is acquired in the state acquisition step.

According to the method in (8), it is possible to attain the same effect as in the information sharing system in (1).

According to the invention, it is possible to appropriately share user information.

BRIEF DESCRIPTION OF THE DRAWINGS

FIG. 5 is a table illustrating an example of user information database according to the embodiment of the invention.

DETAILED DESCRIPTION OF THE INVENTION

Hereinafter, a preferred embodiment of the invention will be described in detail with reference to the accompanying drawings.

<Overall Configuration of Information Sharing System S>

Figure 1:
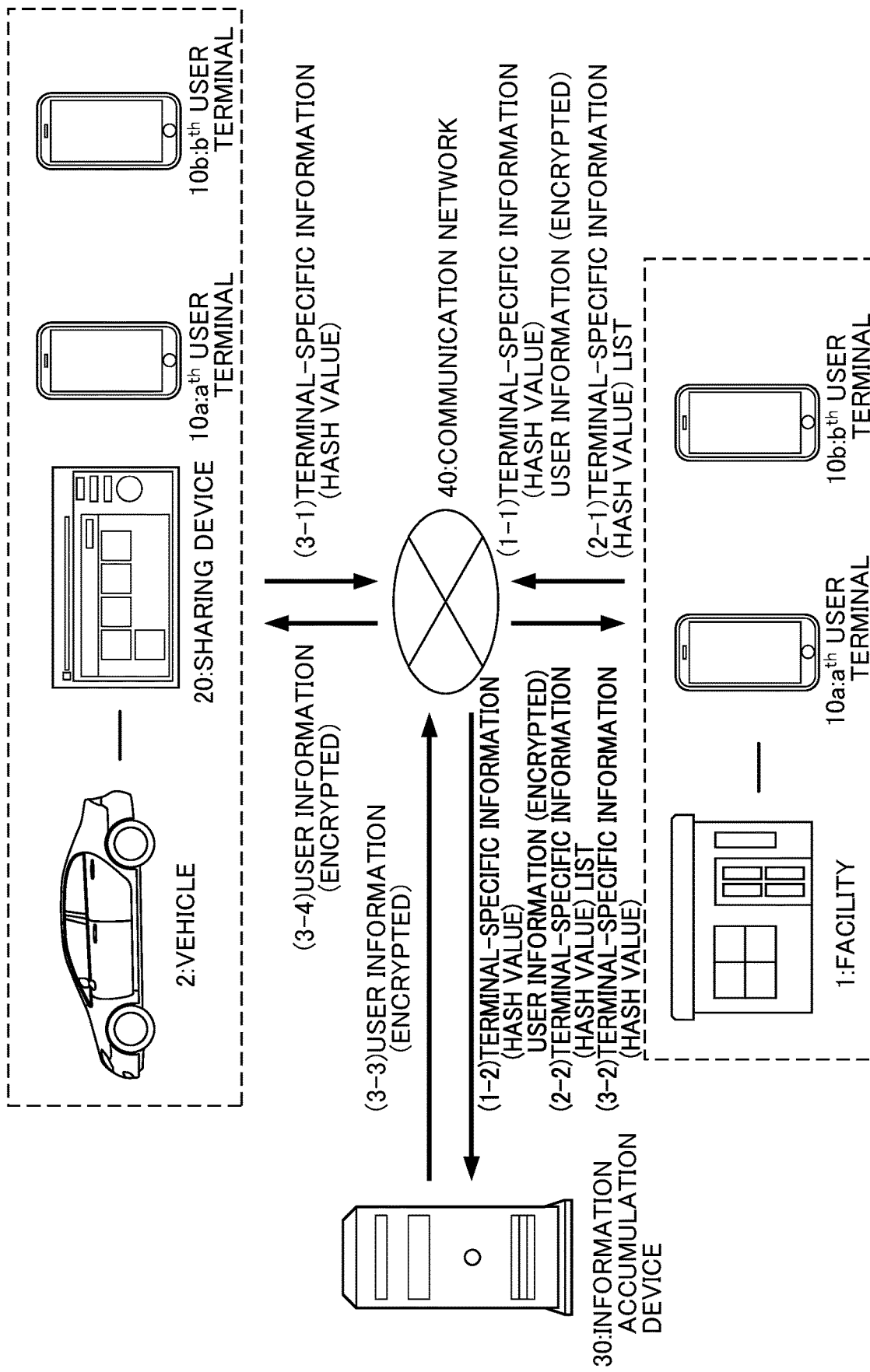
FIG. 1 is a block diagram illustrating a basic configuration of the entirety of an information sharing system according to an embodiment of the invention.

Description will be given of an information sharing system S according to a preferred embodiment of the invention. FIG. 1 illustrates an overall configuration of the information sharing system S.

As illustrated in FIG. 1, the information sharing system S includes a user terminal 10, a sharing device 20, and an information accumulation device 30. The terminal and the devices are connected to each other in a communication possible manner through a communication network 40. Here, for example, a facility 1 may be referred to as a point of interest (POI) such as a house in which a family resides, an office building in which company employees work, and a commercial facility. In addition, a vehicle 2 is a moving body such as a four-wheeled vehicle and a two-wheeled vehicle.

Furthermore, in the drawing, a case where the user terminal 10 is used in the facility 1 or the vehicle 2 is illustrated. In addition, in the drawing, a case where the sharing device 20 is used in the vehicle 2 is illustrated. However, the illustration is illustrative only, and the user terminal 10 or the sharing device 20 may be used in any site regardless of indoor sites or outdoor sites.

In addition, as the user terminal 10, two user terminals including an $a^{th}$ user terminal 10a and a $b^{th}$ user terminal 10b are illustrated in the drawing. In addition, in the drawing, the sharing device 20 and the information accumulation device 30 are illustrated one by one. However, the drawing is illustrative only, and the number of terminals and the number of devices which are included in the information sharing system S may be set in an arbitrary manner. Furthermore, in the following description, when not being discriminated, the $a^{th}$ user terminal 10a and the $b^{th}$ user terminal 10b are simply referred to as "user terminal 10" while omitting an alphabet at the end.

In addition, in the drawing, an example of information that is transmitted and received between the devices and the terminal in processing that is specific to this embodiment is illustrated. However, a plurality of pieces of the information are examples of information that is transmitted and received, and other pieces of information (not illustrated) may be transmitted and received in information sharing system S. Hereinafter, the pieces of information which are transmitted and received will be described after describing a basic function of the terminals and the devices.

The user terminal 10 is a portable terminal or a stationary terminal which is used by a user. The user terminal 10 realizes a predetermined function (for example, an application such as web browsing, voice communication, reproduction of image data or music data, and gaming) in accordance with a user's operation. In addition, with regard to the predetermined function, the user terminal 10 performs communication with another user terminal 10, the sharing device 20, or other devices (for example, a server device that provides predetermined content, and the like) which are connected to the communication network 40.

In addition, the user terminal 10 stores terminal identification information, and the terminal identification information is information specific to every user terminal 10. For example, a media access control (MAC) address that is allocated for every user terminal 10 can be set as the terminal identification information. The user terminal 10 can be realized by a smart phone, a portable telephone, a tablet-type terminal, a notebook computer, and other portable electronic devices.

The sharing device 20 is a terminal that is shared by a plurality of users. In the following description, as an example, a case where the sharing device 20 is an in-vehicle device that is mounted on the vehicle 2 is assumed. However, this is illustrative only, and the sharing device 20 may be a pc and the like which are provided in a commercial facility, a school, and the like as an example. The sharing device 20 realizes a predetermined function (for example, as in the user terminal 10, an application such as web browsing, voice communication, reproduction of image data or music data, and gaming) in accordance with a user's operation. In addition, in a case where the sharing device 20 is an in-vehicle device, for example, the sharing device 20 may have a function of realizing a route guidance (car navigation) with respect to a user who gets on the vehicle 2. In addition to the function, for example, the sharing device 20 may have a function as a relay device that realizes a local area network (LAN) in the vehicle 2.

In addition, the sharing device 20 stores sharing device identification information, and the sharing device identification information is information that is specific for every sharing device 20. For example, as in the user terminal 10, the MAC address that is allocated for every sharing device 20 can be set as the terminal identification information. For example, the sharing device 20 can be realized by a car navigation device that is mounted in the vehicle 2 that is a moving body, or a portable navigation device (PND) that is simply mounted in the vehicle 2 that is a moving body.

The information accumulation device 30 collects terminal-specific information and user information from the user terminal 10, and accumulates pieces of information which are collected. In addition, the information accumulation device 30 transmits the accumulated user information to the sharing device 20 in order for the accumulated user information to be shared between respective users.

Furthermore, for example, the information accumulation device 30 may be realized by combining software that is specific to this embodiment to a general-purpose server device.

The communication network 40 is realized by a network such as the Internet, a portable telephone network, and the LAN, or a network in combination of the networks. Furthermore, with regard to communication through the communication network 40 and communication that is performed between the user terminal 10 and the sharing device 20, a communication method is not particularly limited. For example, communication through the communication network 40 may conform to a communication standard such as IEEE 802.11, $3^{rd}$ generation (3G), long term evolution (LTE), and $4^{th}$ generation (4G). In addition, for example, communication that is performed between the user terminal 10 and the sharing device 20 may conform to a non-contact short-range communication standard based on a standard such as Wi-Fi (registered trademark), Bluetooth (registered trademark), and near field communication (NFC), or may conform to a wired short-range communication through a universal serial bus (USB) cable and the like.

Next, description will be given of information that is transmitted and received between respective terminals and respective devices which are included in the information sharing system S. The information sharing system S performs "collection processing", "association processing", and "sharing processing" as processing related to the transmission and reception of pieces of the information.

The "collection processing" is a series of processing in which the information accumulation device 30 collects terminal-specific information and user information from respective user terminals 10, and accumulates the collected pieces of information. More specifically, each of the user terminals 10 calculates a hash value of terminal-specific information thereof on the basis of a predetermined hash function. In addition, the user terminal 10 sets the calculated hash value as an encryption key, and encrypts user information stored in the user terminal 10 on the basis of a predetermined encryption algorithm. In addition, as indicated by (1-1) and (1-2) in the drawing, the user terminal 10 transmits the hash value of the terminal-specific information and the encrypted user information to the information accumulation device 30 through the communication network 40. The information accumulation device 30 stores the received hash value of the terminal-specific information and the encrypted user information in a database in correlation with each other.

Furthermore, in this embodiment, with regard to the predetermined hash function for calculating the hash value, and the encryption algorithm for performing encryption, there is no particular limitation, and an arbitrary hash function and an arbitrary encryption algorithm can be used in accordance with an environment in which this embodiment is applied, and the like. However, it is assumed that respective terminals and respective devices which are included in the information sharing system S use a common hash function and a common encryption algorithm.

The "association processing" is a series of processing in which the information accumulation device 30 acquires terminal-specific information of the user terminals 10 which are correlated with each other from the user terminals 10, and associates the user terminals 10 on the basis of the acquired correlation information. More specifically, when performing communication with another user terminal 10, each of the user terminals 10 acquires a hash value of terminal-specific information of the other user terminal 10 from the other user terminal 10. In addition, the user terminal 10 correlates the acquired hash value of the terminal-specific information of the other user terminal 10 and a hash value of terminal-specific information of the user terminal 10 with each other to generate a list of the hash value of the terminal-specific information. The list becomes a list indicating that the user terminals 10 are correlated with each other. In addition, as indicated by (2-1) and (2-2) in the drawing, each of the user terminals 10 transmits the generated list to the information accumulation device 30 through the communication network 40. The information accumulation device 30 associates hash values of pieces of pieces of terminal-specific information (that is, the user terminals 10), which are accommodated in the database, of the user terminals 10 on the basis of the hash values of the user terminals 10 which are included in the received list.

The "sharing processing" is a series of processing in which the information accumulation device 30 transmits the accumulated user information to the sharing device 20 in order for users to share the accumulated user information. More specifically, the sharing device 20 acquires a hash value of terminal-specific information from each user terminal 10. For example, the sharing device 20 acquires the hash value of the terminal-specific information from each user terminal 10 that exists inside the vehicle 2. In addition, as indicated by (3-1) and (3-2) in the drawing, the sharing device 20 transmits the acquired hash value of the terminal-specific information of the user terminal 10 to the information accumulation device 30 through the communication network 40. As indicated by (3-3) and (3-4) in the drawing, the information accumulation device 30 transmits user information corresponding to the received hash value of the terminal-specific information of the user terminal 10, and user information corresponding to a hash value of a user terminal 10 associated with the received hash value of the terminal-specific information of the user terminal 10 to the sharing device 20 through the communication network 40. The sharing device 20 decodes each piece of user information that is received with a hash value of specific information of the corresponding user terminal 10 to allow the user information to be shared. For example, a plurality of users use the user information, or transmit the shared information to the user terminal 10 with the sharing device 20.

As described above, in the present embodiment, in a case where specific information of the user terminal 10 can be acquired, the user information can be shared with the sharing device 20. Accordingly, it is possible to prevent the user information from being shared at a site that is not intended by a user of the user terminal 10. That is, according to the invention, it is possible to appropriately share the user information.

<Functional Block Provided in User Terminal 10>

Next, description will be given of a functional block that is provided in the user terminal 10 with reference to a block diagram of FIG. 2.

Figure 2:
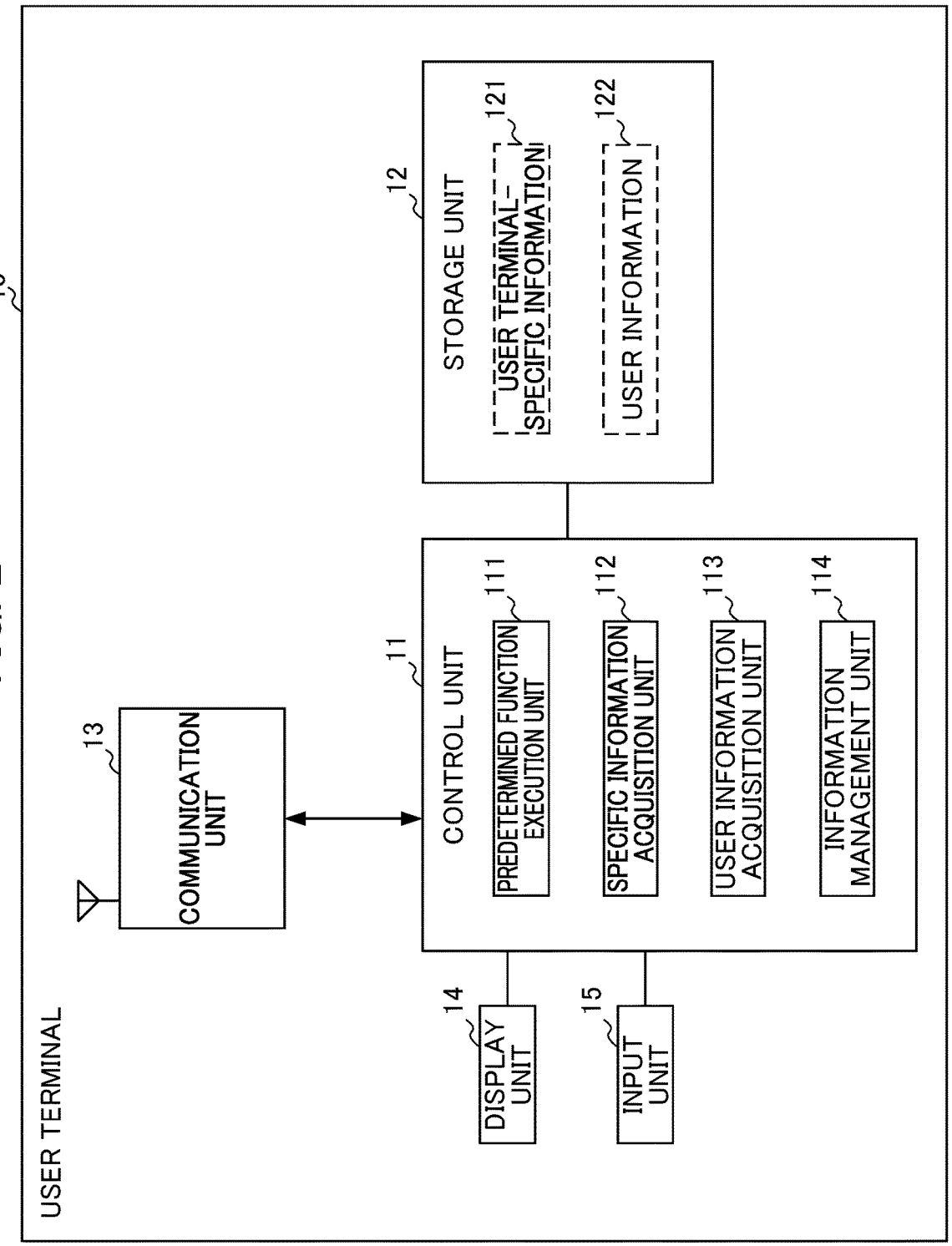
FIG. 2 is a functional block diagram illustrating a functional configuration of a user terminal according to the embodiment of the invention.

As illustrated in FIG. 2, the user terminal 10 includes a control unit 11, a storage unit 12, a communication unit 13, a display unit 14, and an input unit 15. For example, the user terminal 10 is supplied with electric power from a battery (not illustrated) that is embedded in the user terminal 10.

The control unit 11 is constituted by an operation processing device such as a microprocessor, and performs control of respective units which constitute the user terminal 10. Details of the control unit 11 will be described later.

The storage unit 12 is constituted by a semiconductor memory, and stores a control program that is called firmware or the like, a program for performing a predetermined function, and a program for executing the processing described above with reference to FIG. 1. In addition, the storage unit 12 stores various pieces of information which are set as a processing target of the programs. In the drawing, as information that is stored in the storage unit 12, user terminal-specific information 121 and user information 122 as information that is particularly related to this embodiment.

The user terminal-specific information 121 is information for identifying the user terminal 10. The user terminal-specific information 121 is information that is specific for every user terminal 10. For example, the MAC address that is allocated for every user terminal 10 may be set as the user terminal-specific information 121.

The user information 122 represents information related to use of the user terminal 10 by a user, and the like. For example, the user information 122 is information that is generated or acquired in a case where a predetermined function is executed by a predetermined function execution unit 111 to be described later, and examples of the user information 122 include a text indicating private information of a user, content data such as an image and music data which are reproduced by the user, a search history in internet browsing, and the like. The user information 122 is also information indicating preference, a taste, and the like of a user individual.

Pieces of information which are accommodated in the storage unit 12 may be stored in the storage unit 12 in advance, or may be appropriately downloaded from a server device (not illustrated) that is connected to the communication network 40 as necessary. In addition, the respective pieces of information may be appropriately corrected in accordance with a user's input and the like, or may be appropriately updated in accordance with execution of a predetermined function.

The communication unit 13 includes a digital signal processor (DSP) and the like, and realizes communication between other user terminals 10, communication with the sharing device 20, or communication with the information accumulation device 30. A communication method in the communication is not particularly limited as described above. For example, the communication unit 13 is used to transmit and receive predetermined information by respective functional blocks realized by the control unit 11.

The display unit 14 is constituted by a display device such as a liquid crystal display and an organic electroluminescence panel. The display unit 14 receives an instruction from the respective functional blocks realized by the control unit 11 and displays predetermined information.

The input unit 15 is constituted by an input device such as a physical switch and a touch panel that is provided to overlap a display surface of the display unit 14. An operation by a user can be realized by outputting a signal based on an operation input from the input unit 15, for example, pressing of the physical switch by the user, and the like to the respective functional blocks realized by the control unit 11. Furthermore, in the drawing, the display unit 14 and the input unit 15 are provided integrally with the user terminal 10, but the display unit 14 and the input unit 15 may be realized by a display or an external device that is separated from the user terminal 10.

Next, details of the control unit 11 will be described. The control unit 11 is constituted by a microprocessor including a central processing unit (CPU), a random access memory (RAM), a read only memory (ROM), and an input/output (I/O), and the like. The CPU executes respective programs which are read out from the ROM or the storage unit 12, reads out information from the RAM, the ROM, and the storage unit 12 during the execution, performs writing of the information with respect to the RAM and the storage unit 12, and transmits and receives a signal to and from the communication unit 13, the display unit 14, and the input unit 15.

In addition, when the hardware and the software (program) cooperate as described above, the processing in this embodiment is realized.

The control unit 11 includes a predetermined function execution unit 111, a specific information acquisition unit 112, a user information acquisition unit 113, and an information management unit 114 as a functional block. The predetermined function execution unit 111 is a unit that executes a predetermined function. Here, for example, the predetermined function is a function of an application such as web browsing, voice communication, reproduction of image data or music data, and gaming as described above. In a case where the user information is generated in accordance with execution of the predetermined function, the predetermined function execution unit 111 stores the user information in the storage unit 12 as the user information 122.

The specific information acquisition unit 112 is a unit that acquires the user terminal-specific information 121 that is stored in the storage unit 12 as the user terminal-specific information in processing such as the "collection processing", the "association processing", and the "sharing processing". In addition, the specific information acquisition unit 112 further acquires the user terminal-specific information of another user terminal 10 from the other user terminal 10 in processing of the "association processing". The specific information acquisition unit 112 outputs the acquired user terminal-specific information to the information management unit 114.

The user information acquisition unit 113 is a unit that acquires the user information 122 stored in the storage unit 12 as the user information in processing such as the "collection processing". The user information acquisition unit 113 outputs the acquired user information to the information management unit 114.

The information management unit 114 is a unit that calculates a hash value of the user terminal-specific information acquired by the specific information acquisition unit 112 on the basis of a predetermined hash function in processing such as the "collection processing", the "association processing", and the "sharing processing". In processing of the "collection processing", the information management unit 114 sets the hash value of the terminal-specific information of the user terminal 10 as an encryption key, and encrypts the user information acquired by the user information acquisition unit 113 on the basis of a predetermined encryption algorithm. In addition, the information management unit 114 transmits the hash value of the terminal-specific information of the user terminal 10, and the encrypted user information to the information accumulation device 30 through the communication network 40.

In addition, in processing of the "collection processing", the information management unit 114 correlates the hash value of the terminal-specific information of the user terminal 10, and the hash value of the terminal-specific information acquired from the other user terminal 10 to generate a list of the terminal-specific information. In addition, the information management unit 114 transmits the generated list to the information accumulation device 30 through the communication network 40. In addition, in processing of the "collection processing", the information management unit 114 transmits the hash value of the terminal-specific information of the user terminal 10 to the sharing device 20.

<Functional Block Provided in Sharing Device 20>

Next, a functional block provided in the sharing device 20 will be described with reference to a block diagram of FIG. 3. Here, the sharing device 20 is supplied with electric power, for example, from a cigarette lighter socket of the vehicle 2.

Figure 3:
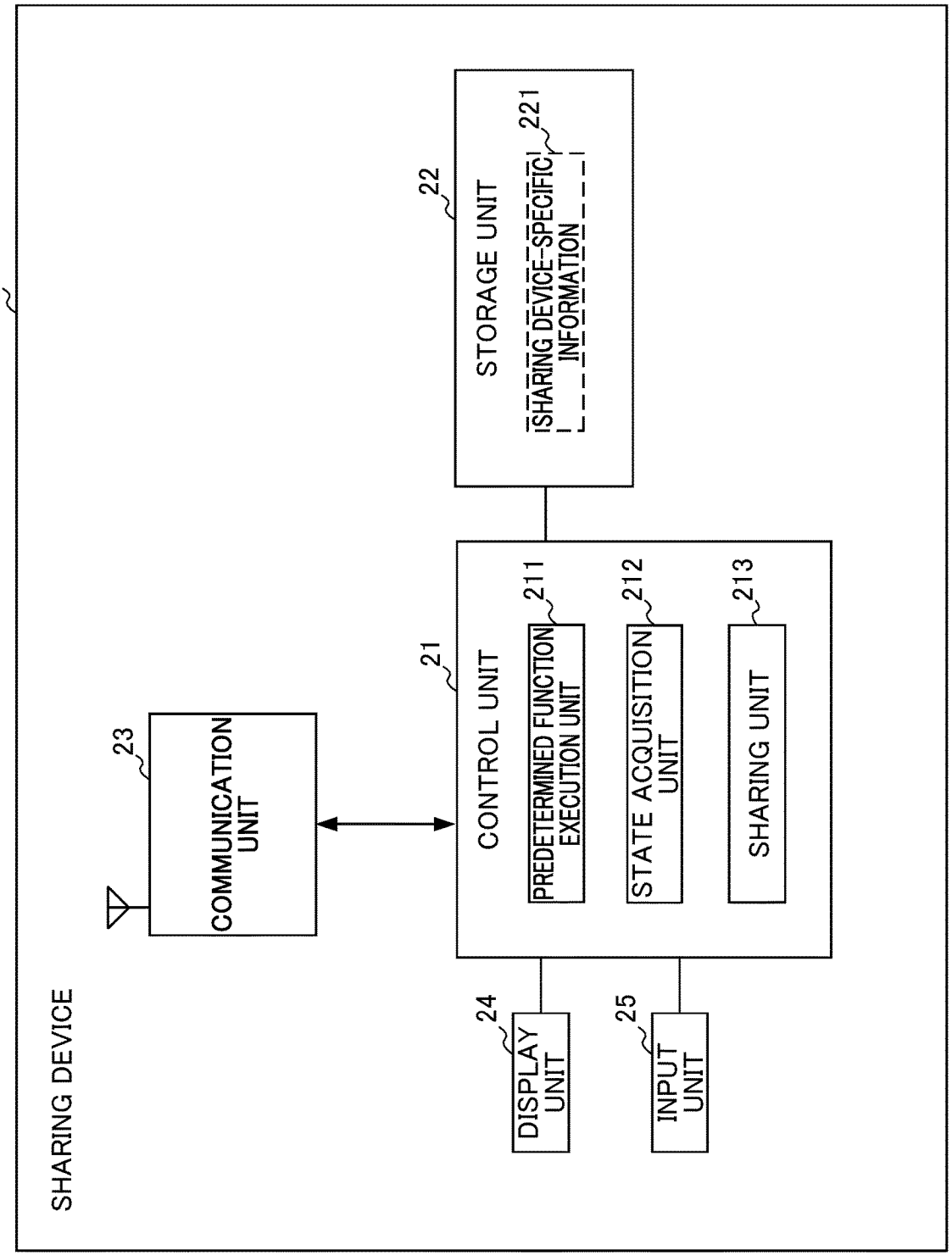
FIG. 3 is a functional block diagram illustrating a functional configuration of a sharing device according to the embodiment of the invention.

As illustrated in FIG. 3, the sharing device 20 includes a control unit 21, a storage unit 22, a communication unit 23, a display unit 24, and an input unit 25. Here, the control unit 21, the storage unit 22, the communication unit 23, the display unit 24, and the input unit 25 have the same hardware function as in the functional block with the same terminology in the user terminal 10, and thus redundant description will be omitted.

However, information that is stored in the storage unit 22 of the sharing device 20 and the information that is stored in the storage unit 12 of the user terminal 10 are partially different from each other. In addition, a functional block provided in the control unit 21 of the sharing device 20 and the functional block of the control unit 11 of the user terminal 10 are partially different from each other. Hereinafter, a difference between the sharing device 20 and the user terminal 10 will be described in detail.

As in the storage unit 12, the storage unit 22 is constituted by a semiconductor memory or the like, and stores a control program that is called firmware or the like, a program for executing a predetermined function, a program for executing the processing described above with reference to FIG. 1, a program for performing communication relay, or a program for performing route guidance. In addition, the storage unit 22 stores various pieces of information which are set as a processing target of the programs.

In the drawing, as information that is stored in the storage unit 22, sharing device-specific information 221 as information that is particularly related to this embodiment is illustrated. The sharing device-specific information 221 is information for identifying the sharing device 20. The sharing device-specific information 221 is information that is specific for every sharing device 20. For example, as in the user terminal-specific information 121, a MAC address that is allocated for every sharing device 20 can be set as the sharing device-specific information 221.

The control unit 21 includes a predetermined function execution unit 211, a state acquisition unit 212, and a sharing unit 213 as functional blocks. The predetermined function execution unit 211 is a unit that executes a predetermined function. Here, for example, the predetermined function is the same function as the function that is realized by the predetermined function execution unit 111. For example, the predetermined function execution unit 211 may realize a function of performing route guidance related to movement of the vehicle 2, or a function as a relay device for realizing a LAN in the vehicle 2 in addition to the above-described function. Furthermore, for example, in a case where the function of performing the route guidance is provided, hardware for measuring a position of the sharing device 20 (that is, a position of the vehicle 2) may be provided in the sharing device 20. For example, hardware such as a global positioning system (GPS) sensor, a gyro sensor and an acceleration sensor may be provided.

The state acquisition unit 212 is a unit that acquires information indicating a use state of the sharing device 20 in processing of the "sharing processing". The state acquisition unit 212 acquires terminal-specific information of each user terminals 10 from the user terminal 10 that currently accesses the sharing device 20 for communication as information indicating the user state of the sharing device 20. According to this, it is possible to specify a use state indicating whether or not any user terminal 10 (that is, a user of any user terminal 10) is using the sharing device 20.

Furthermore, to perform decoding to be described later, the state acquisition unit 212 also acquires terminal-specific information of a user terminal 10 that is associated with the user terminal 10 in the "association processing" from the user terminal 10 that currently accesses the sharing device 20 for communication.

The state acquisition unit 212 outputs the acquired terminal-specific information of the user terminal 10 that currently accesses the sharing device 20, and the acquired terminal-specific information of a user terminal 10 that is associated with the user terminal 10 to the sharing unit 213.

The sharing unit 213 is a unit that shares user information in processing of the "sharing processing". The sharing unit 213 calculates a hash value of the terminal-specific information of the user terminal 10 which is input from the state acquisition unit 212. In addition, the sharing unit 213 acquires the sharing device-specific information 221 stored in the storage unit 22 as sharing device-specific information. In addition, the sharing unit 213 calculates a hash value of the acquired sharing device-specific information. In addition, the sharing unit 213 transmits the hash value of the terminal-specific information of the user terminal 10 that currently accesses the sharing device 20 for communication, and the hash value of the sharing device-specific information to the information accumulation device 30 through the communication network 40.

In addition, the sharing unit 213 receives encrypted user information from the information accumulation device 30 through the communication network 40 as a response of the hash value. The encrypted user information is user information related to the user terminal 10 corresponding to the transmitted hash value (and/or a user terminal 10 that is associated with the user terminal 10 corresponding to the transmitted hash value). The sharing unit 213 decodes each piece of the user information that is received with the hash value of the specific information of the corresponding user terminal 10 to allow the user information to be shared. For example, a plurality of users use the user information with the sharing device 20, or transmit shared information to respective user terminals 10.

<Functional Block Provided in Information Accumulation Device 30>

Next, a functional block that is provided in the information accumulation device 30 will be described with reference to the block diagram of FIG. 4. Here, the information accumulation device 30 is supplied with electric power, for example, a home power supply or the like in an installation location of the information accumulation device 30.

Figure 4:
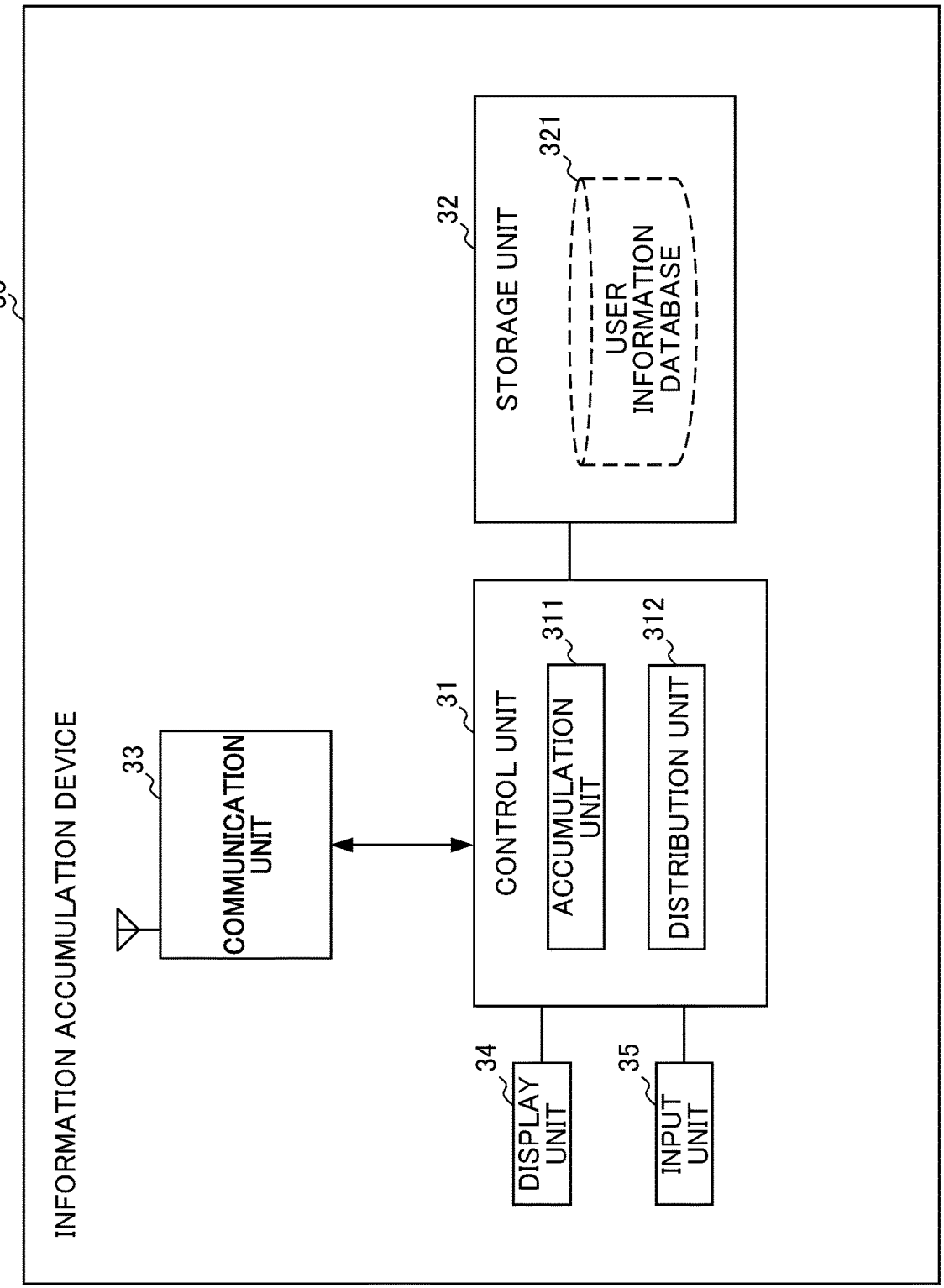
FIG. 4 is a functional block diagram illustrating a functional configuration of information accumulation device according to the embodiment of the invention.

As illustrated in FIG. 4, the information accumulation device 30 includes a control unit 31, a storage unit 32, a communication unit 33, a display unit 34, and an input unit 35. Here, the control unit 31, the storage unit 32, the communication unit 33, the display unit 34, and the input unit 35 have the same hardware function as in the functional block with the same terminology in the user terminal 10 or the sharing device 20, and thus redundant description will be omitted.

However, information that is stored in the storage unit 32 of the information accumulation device 30, and information that is stored in the storage unit 12 of the user terminal 10 or the storage unit 22 of the sharing device 20 are partially different from each other. In addition, a functional block that is provided in the control unit 31 of the information accumulation device 30, and the functional block of the control unit 11 of the user terminal 10 or the control unit 21 of the sharing device 20 are partially different from each other. Hereinafter, a difference between the information accumulation device 30, and the user terminal 10 and the sharing device 20 will be described in detail.

As in the storage unit 12 and the storage unit 22, the storage unit 32 is constituted by a semiconductor memory or the like, and stores a control program called firmware or the like, and a program for executing the processing described above with reference to FIG. 1. In addition, the storage unit 32 stores various pieces of information which are set as a processing target of the programs.

In the drawing, as information that is stored in the storage unit 32, user information database 321 as information that is particularly related to this embodiment is illustrated. The user information database 321 is a database that accumulates the terminal-specific information, association information of the user terminals 10, and the user information which are received in the "collection processing" and the "association processing". A data structure of the user information database 321 will be described later with reference to FIG. 5.

The control unit 31 includes an accumulation unit 311 and a distribution unit 312 as functional blocks. The accumulation unit 311 is a unit that constructs and updates the user information database 321 by storing the terminal-specific information, the association information between the user terminals 10, and the user information which are received from respective user terminals 10 and the sharing device 20 in the user information database 321 in the "collection processing" and the "association processing".

The distribution unit 312 is a unit that distributes the user information to the sharing device 20 in processing of the "sharing processing". The distribution unit 312 receives the hash value of the terminal-specific information of each user terminal 10 that currently accesses the sharing device 20 for communication, and the acquired sharing device-specific information from the sharing device 20 through the communication network 40. In this manner, the distribution unit 312 searches the user information database 321 by using the received hash value as a search key to extract user information related to a user terminal 10 corresponding to the received hash value (and/or a user terminal 10 that is associated with the user terminal 10 corresponding to the transmitted hash value). Furthermore, as described above, the user information may be encrypted by the user terminal 10 that is an acquisition source of the user information.

The distribution unit 312 transmits the extracted user information to the sharing device 20. Here, a case where a plurality of the sharing devices 20 exist is also considered, and thus a sharing device 20 that is a transmission destination is specified on the basis of the sharing device-specific information. Furthermore, in a case where the user information cannot be extracted, the distribution unit 312 transmits information indicating non-existence of the user information to the sharing device 20.

<User Information Database>

Next, an example of a data structure of the user information database 321 will be described with reference to FIG. 5.

As illustrated in FIG. 5, in the user information database 321, each user terminal 10 is set as one record. In addition, information in each record is accommodated in a field of a corresponding column. Examples of columns which constitute the user information database 321 include "terminal-specific information", "associated terminal-specific information", and "user information".

Specific content of information that is accommodated in each of the columns will be described. The "terminal-specific information" is information for identifying each user terminal 10. In processing of the "collection processing", the accumulation unit 311 stores the hash value of the terminal-specific information which is received from the user terminal 10 in a field of "terminal-specific information".

The "associated terminal-specific information" is information for identifying another user terminal 10 associated the user terminal 10. In the "association processing", the accumulation unit 311 stores the hash value of the terminal-specific information of a correlated user terminal 10, which is included in the list received form the user terminal 10, in a field of the "associated terminal-specific information". For example, in a case where an $a^{th}$ user terminal 10*a* and a $b^{th}$ user terminal 10*b* are included in the list, the accumulation unit 311 stores a hash value of terminal-specific information of the $b^{th}$ user terminal 10*b* in a field of the "associated terminal-specific information" in a record of the $a^{th}$ user terminal 10*a*, and stores a hash value of terminal-specific information of the $a^{th}$ user terminal 10*a* in a field of the "associated terminal-specific information" in a record of the $b^{th}$ user terminal 10*b*.

The "user information" is user information corresponding to each user terminal 10. In processing of the "collection processing", the accumulation unit 311 stores user information received from each user terminal 10 in a field of "user information" of a corresponding user terminal 10.

Pieces of the information which are accommodated in the columns are transmitted by respective user terminals 10 in processing of the "collection processing" or the "association processing". That is, the accumulation unit 311 stores pieces of information which are received from the user terminals 10 in corresponding information attribute fields to construct and update the user information database 321. Furthermore, the accumulation unit 311 may use a technology such as block chain to prevent alteration of the information accommodated in the user information database 321, and the like.

<Operation of this Embodiment>

Figure 6:
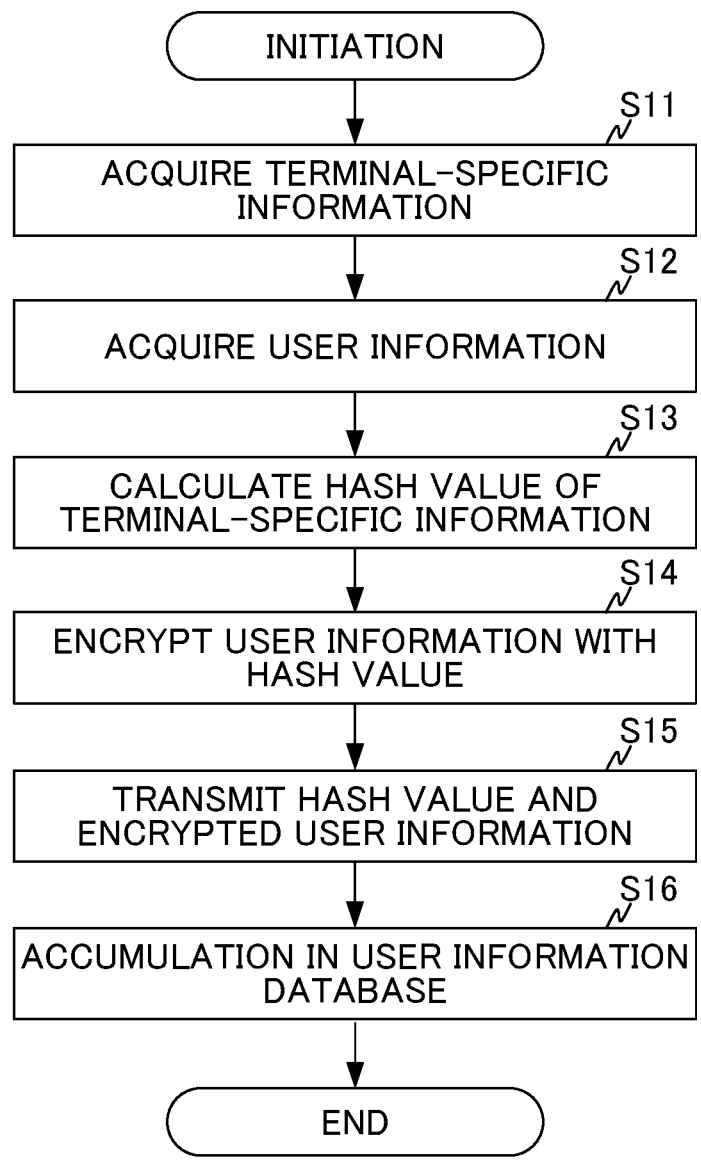
FIG. 6 is a flowchart illustrating a basic operation in collection processing according to the embodiment of the invention.
Figure 7:
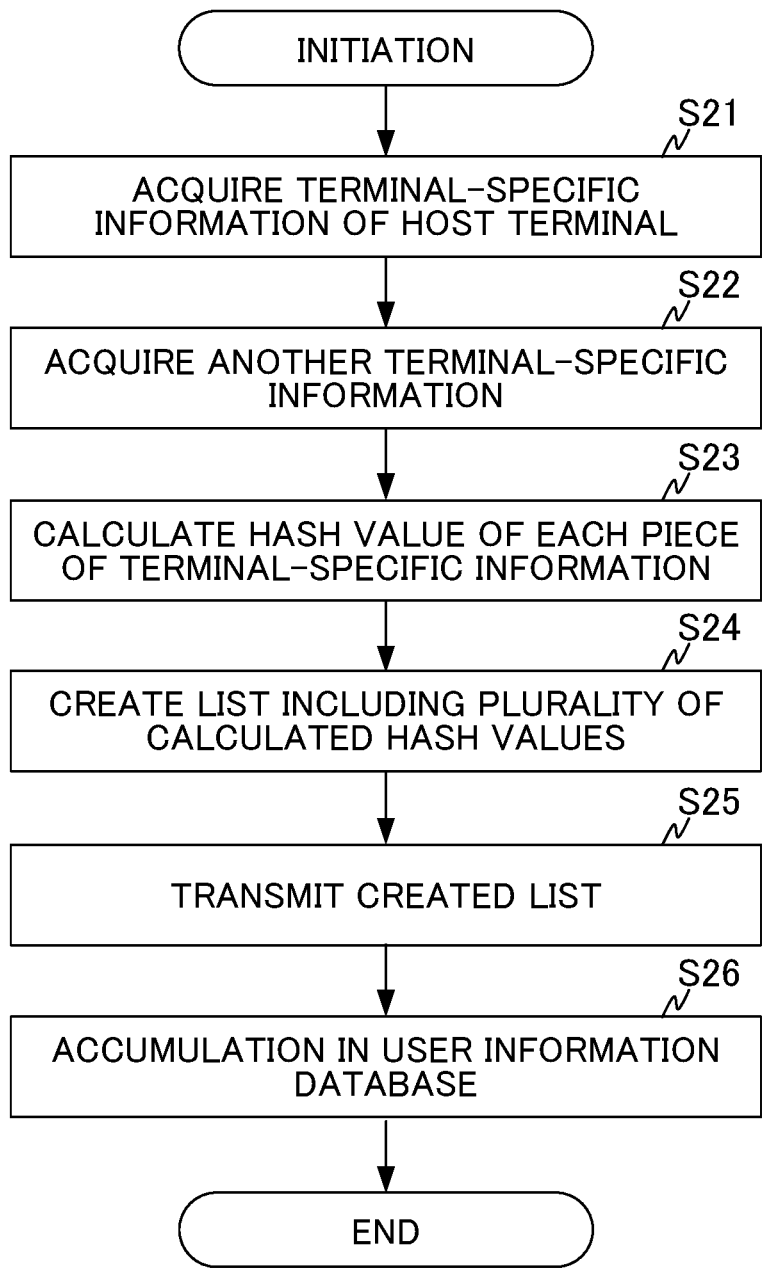
FIG. 7 is a flowchart illustrating a basic operation in association processing according to the embodiment of the invention.
Figure 8:
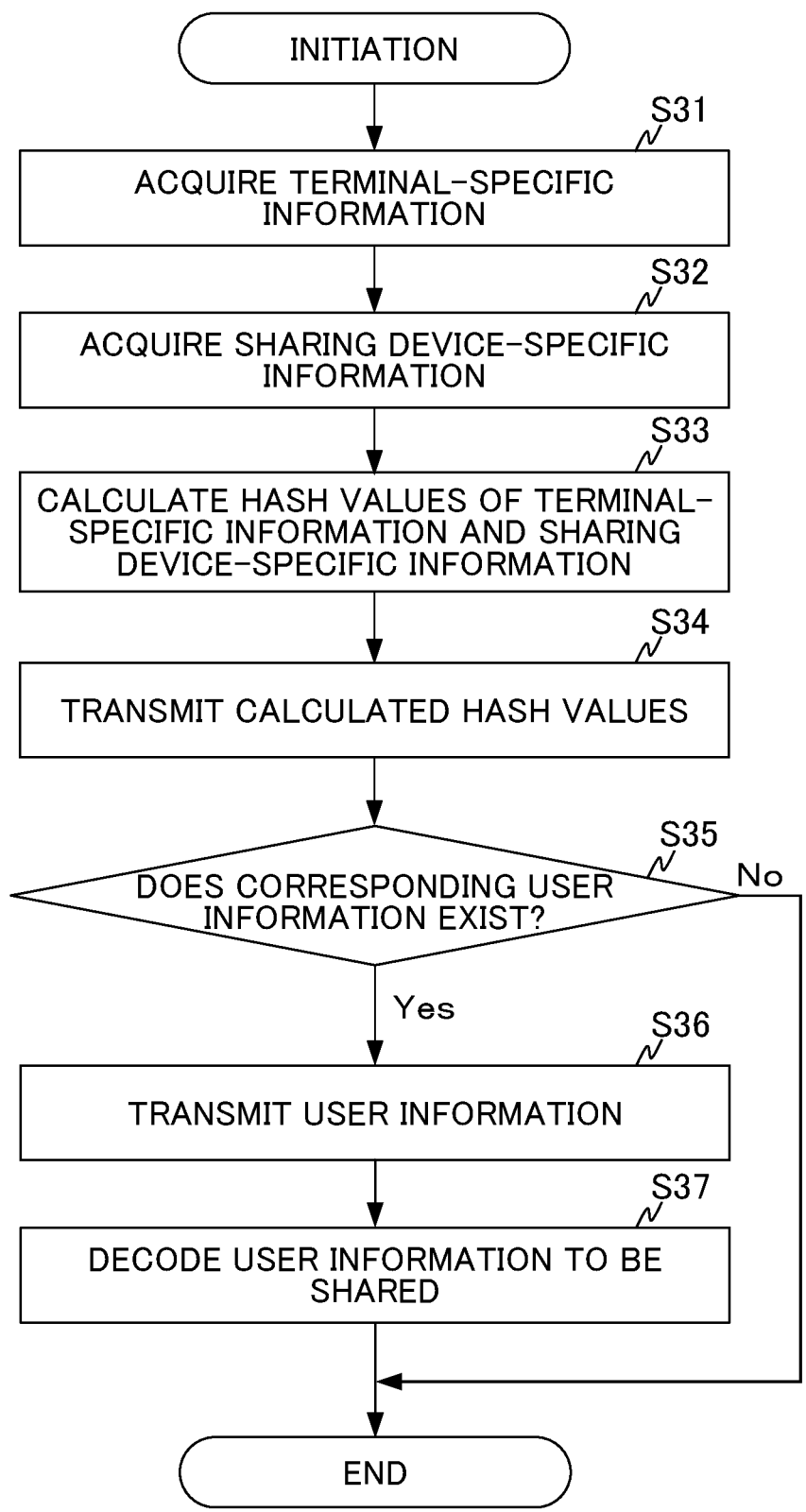
FIG. 8 is a flowchart illustrating a basic operation in sharing processing according to the embodiment of the invention.

Next, an operation of this embodiment will be described with reference to flowcharts of FIG. 6, FIG. 7, and FIG. 8. Here, FIG. 6 is a flowchart illustrating an operation in the "collection processing". In addition, FIG. 7 is a flowchart illustrating an operation in the association processing. In addition, FIG. 8 is a flowchart illustrating an operation in the sharing processing. The operations are initiated at a predetermined cycle, or in response to reception of user's operation and the like as a trigger.

First, the operation in the "collection processing" will be described with reference to FIG. 6. In step S11, the specific information acquisition unit 112 of the user terminal 10 acquires terminal-specific information.

In step S12, the user information acquisition unit 113 of the user terminal 10 acquires user information. Furthermore, for convenience of description in the flowchart, it is described that the user information acquisition unit 113 performs step S12 after the specific information acquisition unit 112 performs step S11, but step S11 may be performed after performing step S12, or step S11 and step S12 may be performed in parallel.

In step S13, the information management unit 114 of the user terminal 10 calculates a hash value of the terminal-specific information that is acquired in step S11. In step S14, the information management unit 114 of the user terminal 10 sets the hash value calculated in step S13 as an encryption key, and encrypts the user information that is acquired in step S12.

In step S15, the information management unit 114 of the user terminal 10 transmits the hash value that is calculated in step S13 and the user information that is encrypted in step S14 to the information accumulation device 30.

In step S16, the accumulation unit 311 of the information accumulation device 30 stores the hash value and the encrypted user information which are received in corresponding fields of the user information database 321. According to this, the "collection processing" is terminated. Through the above-described "collection processing, the latest user information and the like are appropriately accumulated in the user information database 321.

Next, the operation in the "association processing" will be described with reference to FIG. 7. In step S21, the specific information acquisition unit 112 of the user terminal 10 acquires terminal-specific information of the user terminal 10 itself that is executing the processing.

In step S22, the specific information acquisition unit 112 of the user terminal 10 acquires terminal-specific information of another user terminal 10 correlated with the user terminal 10 that is executing the processing (for example, a user terminal 10 that accesses the user terminal 10 that is executing the processing for communication). Furthermore, for convenience of description in the flowchart, it is described that the user information acquisition unit 113 performs step S22 after the specific information acquisition unit 112 performs step S21, but step S21 may be performed after performing step S22, or step S21 and step S22 may be performed in parallel.

In step S23, the information management unit 114 of the user terminal 10 calculates a hash value of the terminal-specific information, which is acquired in step S21, of the user terminal 10 that is executing the processing, and a hash value of the terminal-specific information, which is acquired in step S22, of the other user terminal 10.

In step S24, the information management unit 114 of the user terminal 10 creates a list including a plurality of hash values which are calculated in step S23. In step S25, the information management unit 114 of the user terminal 10 transmits the list created in step S24 to the information accumulation device 30.

In step S26, the accumulation unit 311 of the information accumulation device 30 stores the plurality of hash values included in the received list in corresponding fields of the user information database 321. According to this, the "association processing" is terminated. Through the above-described "association processing", association between user terminals 10 which are correlated with each other is appropriately accumulated in the user information database 321.

Next, the operation in the "sharing processing" will be described with reference to FIG. 8. In step S31, the state acquisition unit 212 of the sharing device 20 acquires terminal-specific information of each user terminal 10 from the user terminal 10 that currently accesses the sharing device 20 as information indicating a use state of the sharing device 20. Furthermore, to perform decoding in step S37 to be described later, the state acquisition unit 212 also acquires terminal-specific information of a user terminal 10 that is associated with the user terminal 10 in the "association processing" from the user terminal 10 that currently accesses the sharing device 20 for communication.

In step S32, the sharing unit 213 acquires the sharing device-specific information 221 stored in the storage unit 22 as sharing device-specific information. Furthermore, for convenience of description in the flowchart, it is described that the sharing unit 213 performs step S32 after the state acquisition unit 212 performs step S31, but step S31 may be performed after performing step S32, or step S31 and step S32 may be performed in parallel.

In step S33, the sharing unit 213 calculates a hash value of the terminal-specific information of the user terminal 10 which is acquired in step S31, and a hash value of the sharing device-specific information which is acquired in step S32. In step S34, the hash value of the terminal-specific information of the user terminal 10 that currently accesses the sharing device 20 for communication, and the hash value of the sharing device-specific information are transmitted to the information accumulation device 30.

In step S35, the distribution unit 312 of the information accumulation device 30 sets the hash values which are received as a search key, and searches the user information database 321 to determine whether or not user information related to a user terminal 10 corresponding to the received hash value (and/or a user terminal 10 that is associated with the user terminal 10 corresponding to the transmitted hash value) can be extracted.

In a case where the user information can be extracted, in step S35, it is determined as Yes, and the processing proceeds to step S36. On the other hand, in a case where the user information cannot be extracted, in step S35, it is determined as No, and the present sharing processing is terminated. On the other hand, in this case, the distribution unit 312 of the information accumulation device 30 may transmit information indicating non-existence of the user information to the sharing device 20.

In step S36, the distribution unit 312 transmits the extracted user information to the sharing device 20. In step S37, the sharing unit 213 of the sharing device 20 decodes each piece of the user information that is received with the hash value of the specific information of a corresponding user terminal 10 to allow the user information to be shared. For example, a plurality of users use the user information, or transmit the shared information to the user terminal 10 with the sharing device 20.

Through the above-described "sharing processing", in a case where specific information of the user terminal 10 can be acquired, the user information can be shared with the sharing device 20. Accordingly, it is possible to prevent the user information from being shared at a site that is not intended by a user of the user terminal 10. That is, according to the invention, it is possible to appropriately share the user information.

MODIFICATION EXAMPLE

The above-described embodiment is a preferred embodiment of the invention. However, the scope of the invention is not limited to the above-described embodiment, and various modifications can be made in a range not departing from the gist of the invention.

First Modification Example

In the above-described embodiment, in the "sharing processing", the sharing device 20 allows all pieces of the acquired user information to be shared. In this case, a priority may be applied to user information, and user information having a high priority may be preferentially shared.

For example, user terminals 10 which are associated with respective user terminals 10 which currently access the sharing device 20 for communication are compared with each other. In addition, in a case where the associated user terminals 10 overlap each other, user information corresponding to the overlapping user terminal 10 may be preferentially shared. The reason for this is as follows. Specifically, there is a high possibility that user terminal 10 that is associated with respective user terminals 10 in an overlapping manner may be a pc or the like that is shared by all member of a family in a home. That is, according to this modification example, it is possible to share the user information of the user terminal 10, which is usually shared, also with the sharing device 20.

Second Modification Example

In the above-described embodiment, in the "sharing processing", the sharing device 20 allows all pieces of the acquired user information to be shared. In this case, a determination may be further made as to whether or not to perform sharing on the basis of a predetermined condition. For example, in a case where users of respective user terminals 10 which currently access the sharing device 20 are determined as a family, the sharing device 20 may share user information, and in a case where the users are not determined as a family, the sharing device 20 may not share the user information.

The determination as to whether or not the users are family may be performed on the basis of an arbitrary method. For example, a communication history of each user terminal 10 with another device is collected in advance. In addition, users of user terminals 10 which access the same other device (for example, the same relay device such as a router) may be determined as a family. In addition, in addition to this, for example, user terminals 10 of a family may be registered in advance, and the determination as to whether or not users are a family may be performed on the basis of the registered content.

Alternatively, as another predetermined condition, for example, a screen and the like, which allows a user to confirm whether or not to permit sharing of user information, may be displayed in the sharing device 20, and a determination as to whether or not to share the user information may be made on the basis of an operation of a user who refers to the screen.

In addition, as still another predetermined condition, in a case where the number of user terminals 10 which currently access the sharing device 20 for communication is equal to or less than a predetermined number (for example, one piece), it is possible to estimate that only one user exists, and thus the user information may be shared without limitation.

Third Modification Example

In the above-described embodiment, in the "sharing processing", the sharing device 20 sets user information acquired from the information accumulation device 30 as a sharing target. In addition to this, another piece of information may be set as the sharing target. For example, the sharing device 20 may acquire correlation information related to user information, and may also share the correlation information that is acquired. In this case, for example, the correlation information may be acquired by performing searching on the Internet on the basis of the user information. For example, in a case where the user information is a history of the Internet searching, the latest correlation information may be acquired by performing the same searching as the searching history.

Alternatively, recommended information such as notification or a coupon related to any product or commercial facility may be acquired as the correlation information. For example, recommended information corresponding to a user attribute (for example, a taste, preference, a gender, and an age of a user, and the like) that is estimated on the basis of the user information may be acquired. In addition, the recommended information that is acquired also may be shared.

Fourth Modification Example

The above-described embodiment may be modified, and user information may be deleted after performing sharing in the "sharing processing". According to this, it is possible to prevent the user information from being used by a user who is a third party after the sharing.

In this case, the sharing device 20 periodically monitors a communication access situation of each user terminal 10 that currently accesses the sharing device 20 for communication. In addition, in a case where the user terminal 10 that currently accesses the sharing device 20 for communication terminates the access to the sharing device 20, sharing of the user information may be terminated, and the user information may be deleted. In addition, in this case, a deletion instruction may be transmitted to the information accumulation device 30, and the user information that is shared may also be deleted from the information accumulation device 30.

Fifth Modification Example

The functional configuration of the above-described embodiment may be modified. That is, the functional configurations illustrated in FIG. 2, FIG. 3, and FIG. 4 are illustrative only, and do not limit the functional configurations of this embodiment. That is, the respective devices may be provided with functions capable of executing a series of processing related to the information determination function of the invention as a whole, and use of any functional block for realization of the function is not limited to the examples in FIG. 2, FIG. 3, and FIG. 4.

In addition, with regard to devices for realizing the functional configurations, description of the embodiment is illustrative only. For example, in the embodiment, description has been given of an example in which the information accumulation device 30 is realized by one piece of server device or the like, but a distribution processing system in which respective functions of the information accumulation device 30 are appropriately distributed to a plurality of server devices may be employed. In addition, the respective functions of the information accumulation device 30 may be realized by using a virtual server function and the like on the cloud. For example, a device that realizes the control unit 31, the storage unit 32, and the communication unit 33 and a device that realizes the display unit 34 and the input unit 35 may be separated devices, and both the devices may perform communication through the communication network 40. In addition, with regard to the user terminal 10 and the sharing device 20, similarly, parts thereof may be configured as a separated device.

<With Regard to Hardware and Software>

Furthermore, each of the respective devices included in the navigation system can be realized by hardware, software, or a combination thereof. In addition, a navigation method in which the respective devices included in the navigation system cooperate can also be realized by hardware, software, or a combination thereof. Here, realization by software represents realization through scanning and execution of a program by a computer.

The program can be accommodated by using various types of non-transitory computer-readable media, and can be supplied to a computer. The non-transitory computer-readable medium includes various types of tangible storage media. Examples of the non-transitory computer-readable medium include a magnetic recording medium (for example, a flexible disk, a magnetic tape, and a hard disk drive), an magneto-optical recording medium (for example, an magneto-optical disc), a CD-read only memory (CD-ROM), a CD-R, a CD-R/W, and a semiconductor memory (for example, a mask ROM, a programmable ROM (PROM), an erasable PROM (EPROM), a flash ROM, a random access memory (RAM)). In addition, the program may be supplied to the computer with various types of transitory computer-readable media. Examples of the transitory computer-readable media include electric signals, optical signals, and electromagnetic waves. The transitory computer-readable media can supply the program to the computer through a wired communication path such as an electric wire and an optical fiber, or a wireless communication path.

EXPLANATION OF REFERENCE NUMERALS

S INFORMATION SHARING SYSTEM
1 FACILITY
2 VEHICLE
10 USER TERMINAL
20 IN-VEHICLE DEVICE
30 INFORMATION ACCUMULATION DEVICE
40 COMMUNICATION NETWORK
11, 21, 31 CONTROL UNIT
111, 211 PREDETERMINED FUNCTION EXECUTION UNIT
112 SPECIFIC INFORMATION ACQUISITION UNIT
113 USER INFORMATION ACQUISITION UNIT
114 INFORMATION MANAGEMENT UNIT
212 STATE ACQUISITION UNIT
213 SHARING UNIT
311 ACCUMULATION UNIT
312 DISTRIBUTION UNIT
12, 22, 32 STORAGE UNIT
121 USER TERMINAL-SPECIFIC INFORMATION
122 USER INFORMATION
221 SHARING DEVICE-SPECIFIC INFORMATION
321 USER INFORMATION DATABASE
13, 23, 33 COMMUNICATION UNIT
14, 24, 34 DISPLAY UNIT
15, 25, 35 INPUT UNIT

What is claimed is:

1. An information sharing system comprising:
   a specific information acquisition unit that acquires specific information of each terminal from a plurality of user terminals which are carried by users;
   a user information acquisition unit that acquires user information from the plurality of user terminals;
   an information management unit that encrypts the user information that is acquired by the user information acquisition unit on the basis of the specific information that is acquired by the specific information acquisition unit;
   a state acquisition unit that acquires the specific information of a user terminal that accesses a network including a sharing device from the sharing device that is a terminal other than the user terminals; and
   a sharing unit that shares the user information by decoding the user information that is encrypted by the information management unit with the specific information that is acquired by the state acquisition unit.

2. The information sharing system according to claim 1, wherein the specific information acquisition unit further acquires the specific information of other user terminals related to a host user terminal from the user terminals, the information management unit associates user terminals which are correlated with each other on the basis of the specific information of the other user terminals which are correlated with the host user terminal, and the sharing unit shares the user information of the user terminal that accesses the network including the sharing device, and the user information of the user terminals which are associated with the user terminal that accesses the network including the sharing device.

3. The information sharing system according to claim 2, wherein in a case where a plurality of the user terminals which access the network including the sharing device exist, if the user terminals which are associated with the plurality of user terminals overlap each other, the sharing unit preferentially shares user information of the overlapping user terminal.

4. The information sharing system according to claim 1, wherein in a case where a plurality of the user terminals which access the network including the sharing device exist, if users of the plurality of user terminals are not determined as a family, the sharing unit does not share the user information.

5. The information sharing system according to claim 1, wherein in a case where the number of the user terminal that accesses the network including the sharing device is one piece, the sharing unit shares the user information.

6. The information sharing system according to claim 1, wherein the sharing unit acquires recommended information for the user on the basis of the user information that is shared, and also shares the acquired recommended information in addition to the user information.

7. The information sharing system according to claim 1, wherein the state acquisition unit detects that all of the user terminals which access the network including the sharing device terminate access to the network including the sharing device, and the sharing unit performs processing of deleting the user information that is encrypted by the information management unit in response to a situation, in which the state acquisition unit detects that all of the user terminals which access the network including the sharing device terminate access to the network including the sharing device, as a trigger.

8. The information sharing method that is performed by an information sharing system, the method comprising:

a specific information acquisition step of acquiring specific information of each terminal from a plurality of user terminals which are carried by users;

a user information acquisition step of acquiring user information from the plurality of user terminals;

an information management step of encrypting the user information that is acquired in the user information acquisition step on the basis of the specific information that is acquired in the specific information acquisition step;

a state acquisition step of acquiring the specific information of a user terminal that accesses a network including a sharing device from the sharing device that is a terminal other than the user terminals; and a sharing step of sharing the user information by decoding the user information that is encrypted in the information management step with the specific information that is acquired in the state acquisition step.

* * * * *